United States Patent
Simhaee

(10) Patent No.: US 6,696,135 B2
(45) Date of Patent: Feb. 24, 2004

(54) INFLATABLE AIR CELL DUNNAGE

(76) Inventor: Ebrahim Simhaee, 112 N. Maple Dr., Beverly Hills, CA (US) 90210

( * ) Notice: Subject to any disclaimer, the term of this patent is extended or adjusted under 35 U.S.C. 154(b) by 0 days.

(21) Appl. No.: 10/064,088

(22) Filed: Jun. 10, 2002

(65) Prior Publication Data

US 2002/0136858 A1 Sep. 26, 2002

Related U.S. Application Data

(62) Division of application No. 09/296,363, filed on Apr. 22, 1999, now Pat. No. 6,423,166.

(51) Int. Cl.$^7$ .............................. B32B 3/00; B32B 23/02
(52) U.S. Cl. ........................ 428/166; 428/178; 428/188; 428/192
(58) Field of Search ................................ 428/166, 178, 428/192, 188

(56) References Cited

U.S. PATENT DOCUMENTS

| | | | |
|---|---|---|---|
| 3,207,420 A | | 9/1965 | Navarrete-Kindelan |
| 3,554,135 A | | 1/1971 | Duvall et al. |
| 3,660,189 A | | 5/1972 | Troy |
| 4,017,351 A | | 4/1977 | Larson et al. |
| 4,096,306 A | * | 6/1978 | Larson ........................ 428/192 |
| 4,181,285 A | | 1/1980 | Vangedal-Nielsen |
| 4,223,043 A | | 9/1980 | Johnson |
| 4,422,194 A | * | 12/1983 | Viesturs et al. ................. 5/451 |
| 4,465,188 A | | 8/1984 | Soroka et al. |
| 4,551,379 A | | 11/1985 | Kerr |
| 4,587,810 A | | 5/1986 | Fletcher |
| 4,601,937 A | * | 7/1986 | Latussek ...................... 428/132 |
| 4,756,032 A | | 7/1988 | Wang |
| 4,793,123 A | | 12/1988 | Pharo |
| 4,869,939 A | | 9/1989 | Santo |
| 5,030,501 A | | 7/1991 | Colvin et al. |
| 5,263,587 A | | 11/1993 | Elkin et al. |
| 5,288,441 A | * | 2/1994 | Collins ....................... 264/40.2 |
| 5,348,157 A | | 9/1994 | Pozzo |
| 5,395,674 A | | 3/1995 | Schmidt et al. |
| 5,427,830 A | | 6/1995 | Pharo |
| 5,527,012 A | | 6/1996 | Vinkel et al. |
| 5,581,983 A | | 12/1996 | Murakami |

* cited by examiner

Primary Examiner—Donald J. Loney
(74) Attorney, Agent, or Firm—Darby & Darby

(57) ABSTRACT

Air cell dunnage is disclosed which collapses for shipment and is constructed to be subsequently inflated for use. The air cell dunnage is a bubble sheet containing a multiplicity of gas cells and a base layer fused to the bubble layer. The bubble layer further includes conduits interconnecting selected groups of the selected cells and a common channel extending longitudinally on the sheet in fluid communication with each of the selected groups. The conduits provide access to selected groups of gas cells for collapsing and inflating the cells for shipment and use, respectively.

2 Claims, 6 Drawing Sheets

INFLATABLE AIR CELL DUNNAGE

CROSS REFERENCE TO RELATED APPLICATIONS

This application is a division of U.S. patent application Ser. No. 09/296,363 filed Apr. 22, 1999 now U.S. Pat. No. 6,423,166, the specification of which is hereby incorporated herein by reference in its entirety.

BACKGROUND OF THE INVENTION

This invention relates to air cell dunnage and, more particularly, to air cell dunnage which is intended to be inflated at the time of use.

Air cell dunnage is typically used for shipping products which may be subject to breakage. The dunnage may be wrapped around the product or stuffed into a container to prevent movement of the product within the container during shipment and to protect against shock.

Conventionally, manufacturing air cell dunnage involves vacuum forming a multiplicity of bubbles to form a bubble layer. The bubbles are separated by flats which are bonded (thermally) to a flat base layer to form a bubble sheet in which air is trapped within the hemispherical vacuum formed bubble. This bubble sheet or air cell dunnage as it is commonly known, is shipped in this form to end users who use the dunnage to package their products for shipment.

The manufactured bubble sheet is relatively bulky, being close to 100 times the thickness of the combined thickness of the plastic film from which the bubble sheet is manufactured. Obviously, this bulk increases the cost of shipping of the manufactured air cell dunnage to the ultimate end user.

Moreover, the manufacture of the bubble sheet takes place at relatively high temperature (for example, about 20 E c). After the base layer is fused to the bubble layer, the temperature of the bubble sheet drops to room temperature which is approximately 20 E c. Because of this drop in temperature, the volume of the air within the individual bubbles or cells decreases by about 25%. Using these figures, this would mean that only about 75% of the available volume of a bubble is being used. It can be shown that when 75% of the available volume of a bubble is used, the height of the bubble is only 56% of the height of a fully inflated bubble. This means that if the individual bubbles could be expanded to their full size, the bulkiness (thickness) of the product would be almost doubled. Conversely, to achieve the bulkiness of a prior art bubble sheet in which the bubbles are only expanded to 75% of their volume, a fully expanded bubble sheet would require 44% less raw material. Thus, it is desirable to increase the percentage of the available volume of the bubbles which is filled with air.

The main object of this invention is to provide air cell dunnage which can be inflated by the end user, which means that the manufactured product is much less bulky than before and which also enables the individual bubbles to be filled with a greater volume of air.

A further object of the invention is to provide air cell dunnage in which less material is required for a specified amount of bulkiness.

SUMMARY OF THE INVENTION

In accordance with the invention, the individual cells of a bubble sheet are interconnected by a series of conduits which lead to atmosphere. When the bubble layer is fused to the base layer, the conduits function as a vent so that the fused bubble sheet can be flattened to evacuate the air within the bubble sheet. The flattened bubble sheet is shipped to the end user.

The end user inflates the bubble sheets by connecting the conduits to an air supply. This will take place at room temperature which means that the individual cells or bubbles can be completely filled with air. After the bubble sheet has been inflated, the individual conduit(s) are sealed so that the captured air is retained within the bubble sheet which can then be used in conventional fashion.

DETAILED DESCRIPTION

Figure 1:
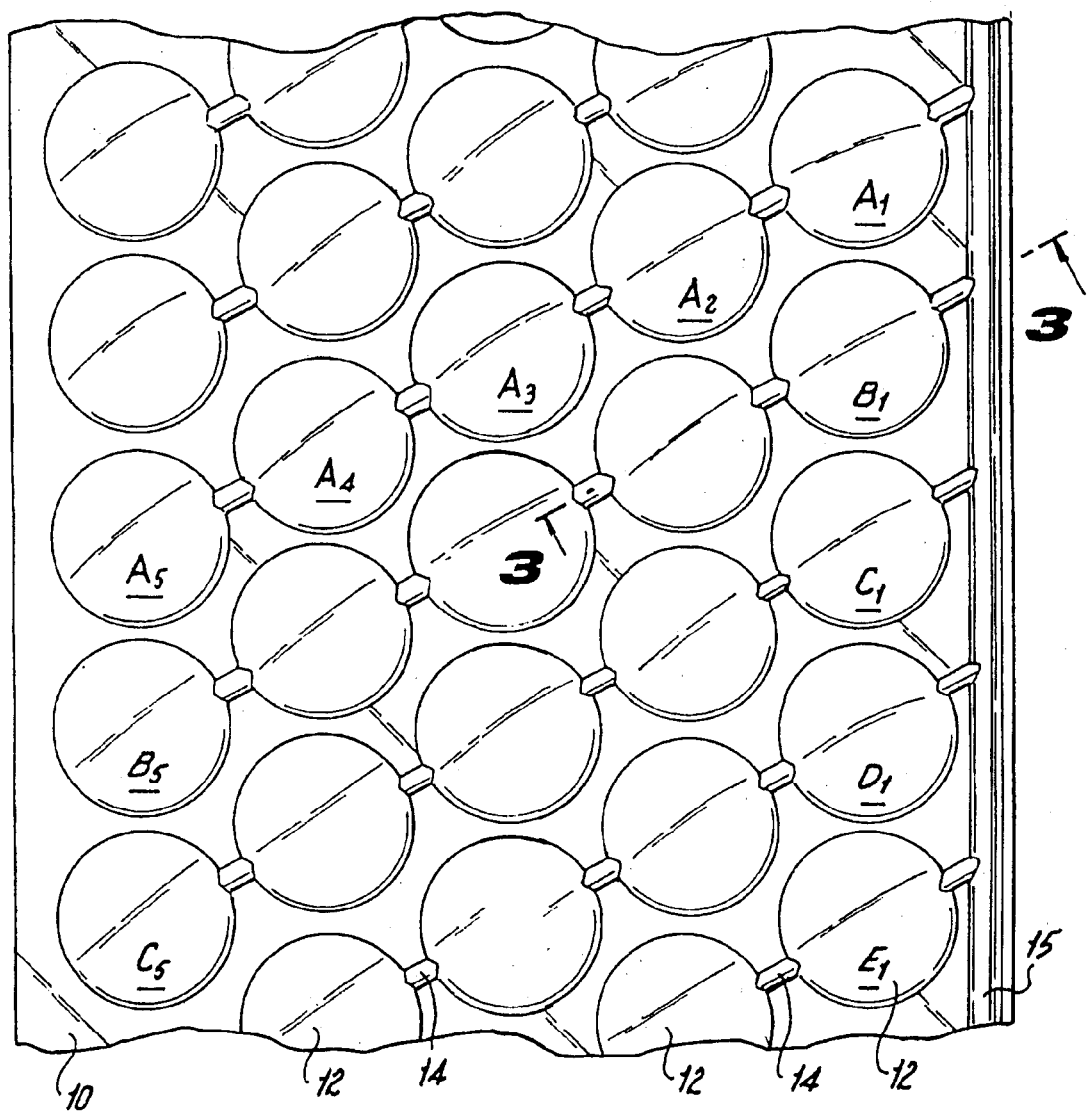
FIG. 1 is a plan view of a bubble sheet in accordance with a preferred embodiment of the invention.

FIG. 1 shows a bubble layer 10 in accordance with the invention after vacuum forming. A multiplicity of bubbles 12 are typically formed in a diagonal pattern which maximizes the number of bubbles in a given area. In accordance with the invention, in each "diagonal" row, the bubbles 12 are interconnected by means of conduits 14. On one side of the sheet, i.e, the right hand side illustrated in FIG. 1, the conduits 14 lead to a channel 15 at the edge of the bubble layer 10. Channel 15 can be used as an exhaust channel for deflating the bubbles and the conduits, and it can be accessed by the end user for the purpose of inflating the bubble sheet as described below.

For purposes of explanation, the interconnected bubbles in a single row have been labeled in FIG. 1 with the letters A through Z, respectively, with the right hand bubbles indicated by the subscript 1 and the bubble in the left hand position of the same row by the subscript 5. For example, a single diagonal row of interconnecting bubbles, contains bubbles $A_1$ through $A_5$. Typically, the sheet 10 will be about 1.5 meters wide which means that a single diagonal row of bubbles may contain as many as sixty bubbles. The drawings are not intended to illustrate an actual bubble sheet but represent instead a schematic example for purposes of explanation.

By way of example only, if the bubbles 12 are formed as one inch hemispheres, the conduits 14 may be semi-cylindrical forms about ⅛ inch in diameter and channel 15 about ¼ inch in diameter. They would also be vacuumed formed during the process of manufacturing the bubble layer. This would mean that the roller which contains the female hemispherical dies for forming the bubbles would also include comparable female semi-cylindrical dies for forming the conduits 14 and channel 15. It is also contemplated that the conduits 14 and channel 15 may be formed in the base layer 16, either in whole or in part.

Figure 2:
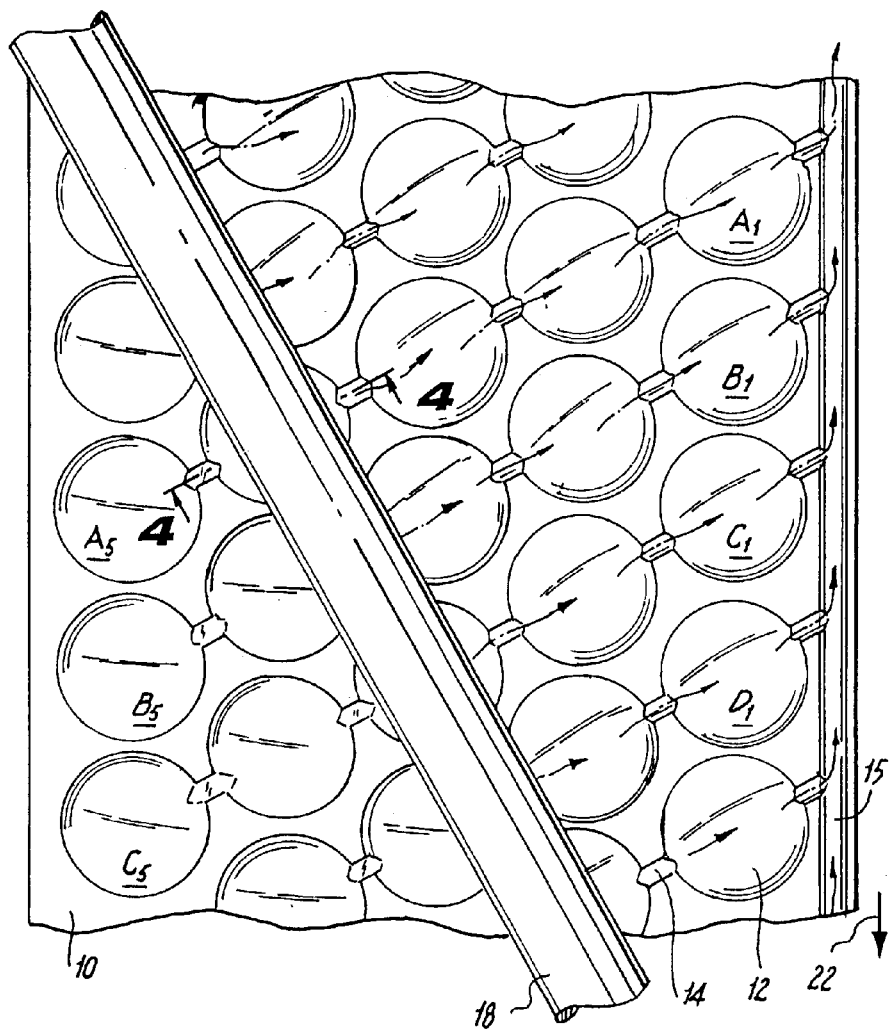
FIG. 2 is a plan view of a bubble sheet showing a preferred mechanism for expelling air from the bubbles.
Figure 3:
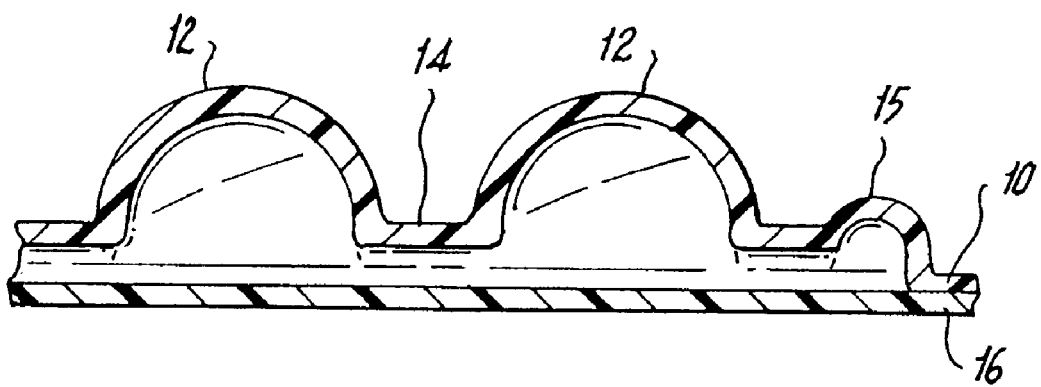
FIG. 3 is a side sectional view along the line 3—3 of FIG. 1.

After the bubble layer shown in FIG. 1 has been formed, it is joined to a base layer 16 in conventional fashion to form a bubble sheet (FIGS. 2 and 3). The base layer 16 contacts the bubble layer only in those regions which are "flat", i.e. the regions outside of the bubbles 12, conduits 14 and channel 15. Typically, layers 10 and 16 are thermally fused together.

Figure 4:
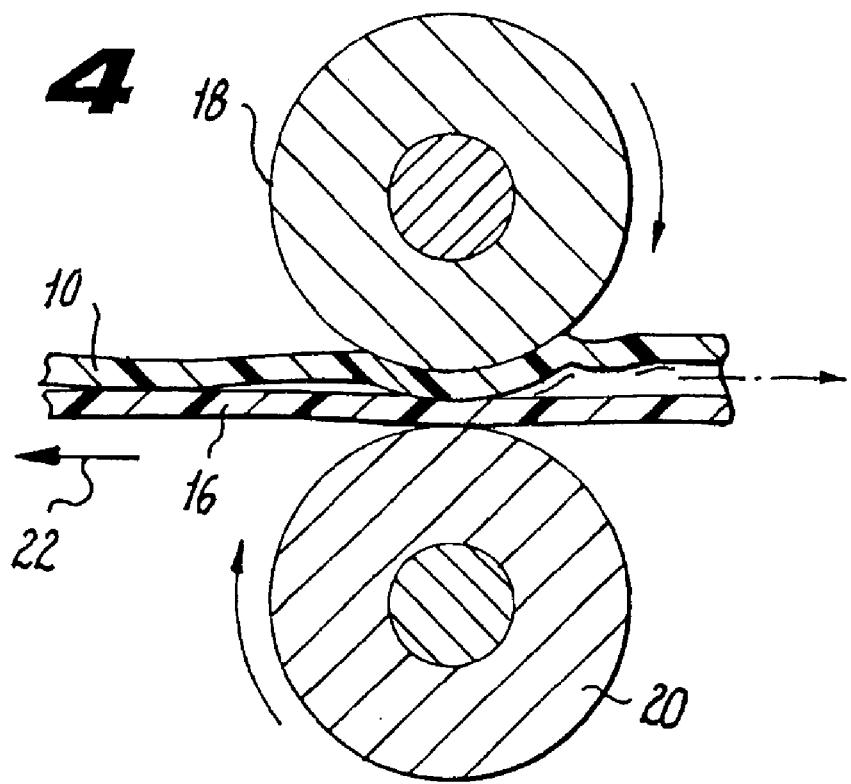
FIG. 4 is a side sectional view along the line 4—4 of FIG. 2.

In accordance with the invention, after the bubble sheet has been formed, the bubbles are deflated so that the sheet can be shipped in a flattened condition. For this purpose, as shown in FIGS. 2 and 4, a pair of nip rollers 18 and 20 are provided. The axes of the nip rollers 18 and 20 are arrayed as shown in FIG. 2 so that they are perpendicular to the conduits 14 of each diagonal row of bubbles A, B, C, etc. The nip rollers 18 and 20 rotate in the direction of the arrows causing air to be expelled from each row of bubbles through the side channel 15 to atmosphere. Assuming that the bubble sheet moves in the direction of arrow 22 as it is produced, the bubbles shown to the left of the nip rollers 18 and 20 will be flattened and the bubbles on the right hand side will still contain air. It is desirable for the nip rollers 18 and 20 to be transverse to the conduits 14 to make sure that all of the air in a given bubble is expelled by the nip rollers. If the nip rollers were not transversed to conduits 14, air could be trapped within the individual bubbles. The nip rollers 18 and 20 do not function to move the bubble sheet and provide only negligible resistance to the movement of the bubble sheet as it is produced.

The flattened bubble sheet, as indicated above, may be approximately 100 times thinner than the inflated bubble sheet. Because of this enormous reduction in bulk, the cost of transporting and storing the bubble sheet is greatly reduced.

After the deflated bubble sheet has been shipped, it is necessary to inflate the bubble sheet so that it can be used. For this purpose, apparatus of the type shown schematically in FIG. 5 can be employed. The apparatus includes a nozzle 30 having an exterior blade 32 which includes a cutting edge 34, and a heat sealing arrangement which includes two rollers 36 and 38 (FIG. 6). As shown the nozzle 30 is tapered with its wider portion sealing the channel 15 so that air from the nozzle cannot escape.

Figure 5:
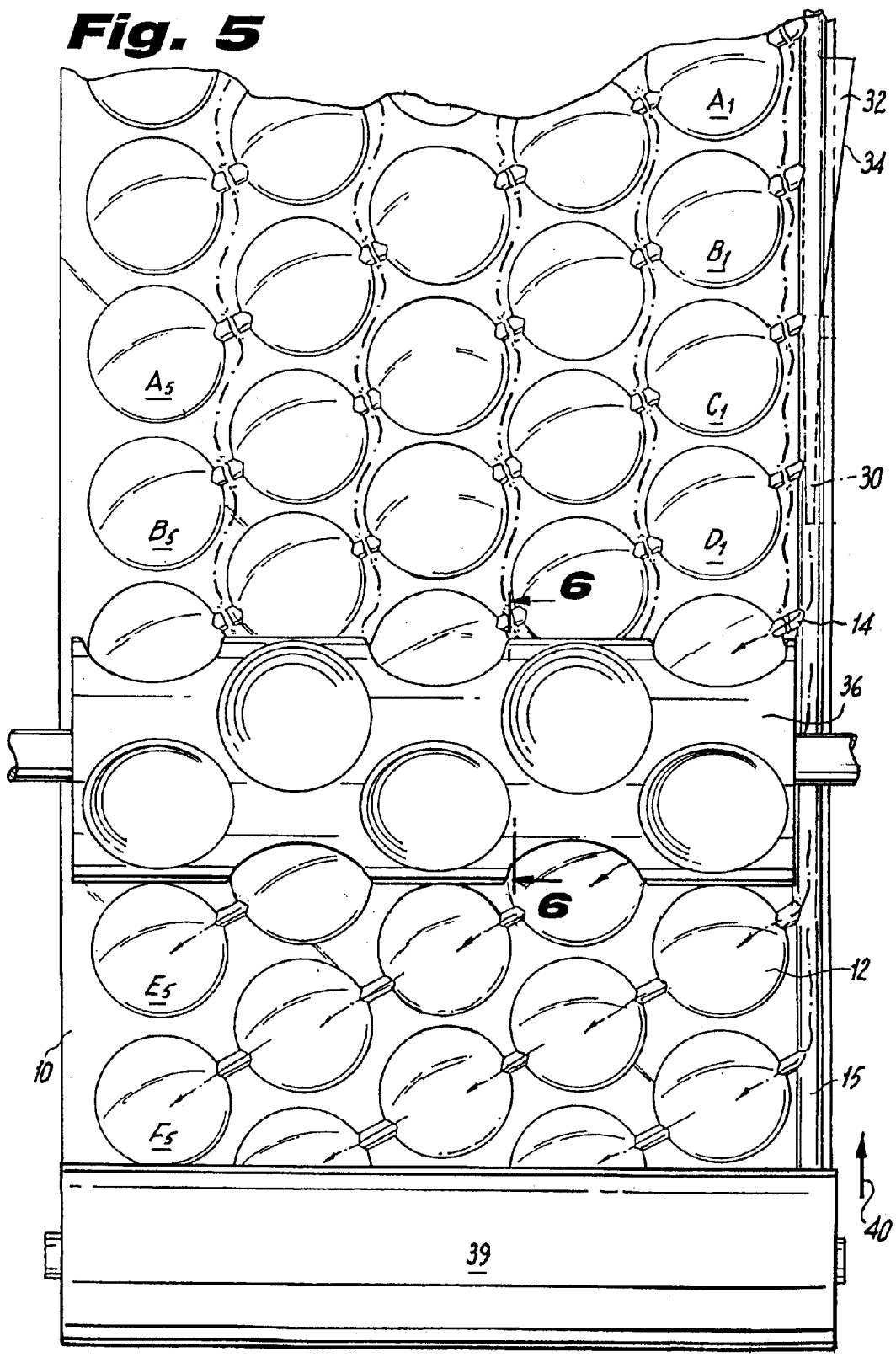
FIG. 5 is a plan view showing schematically how the bubbles are inflated and, the conduits sealed.
Figure 6:
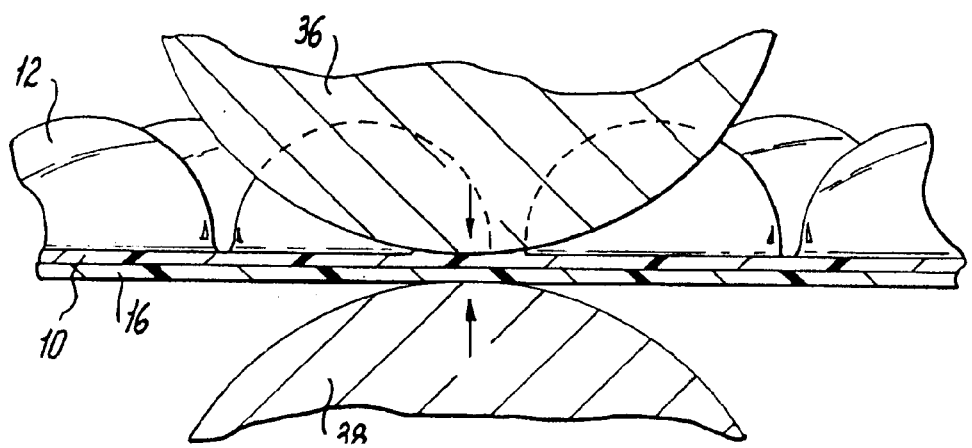
FIG. 6 is a side sectional view along the line 6—6 of FIG. 5.

The flattened bubble sheet typically will be shipped in the form of a large roll as shown at the bottom of FIG. 5 at 39 and will be unwound in the direction of arrow 40 using conventional rollers (not shown). The nozzle 30 is inserted into the leading edge of channel 15. Nozzle 30 provides air under pressure which inflates each of the diagonally interconnected rows of bubbles A, B, C, etc. as the bubble sheet is unrolled. The heat sealing process requires the application of heat and pressure to the plastic bubble sheet in the areas of the conduits 14. For this purpose, the upper roller 36 may include a multiplicity of cavities 42 which conform generally to the shapes of the individual air bubbles. The lower roller 38, on the other hand, may be cylindrical in shape with heating wires embedded in the surface of the cylinder to raise the temperature of the plastic sheet to a temperature at which fusion will occur under the pressure applied by the two rollers. The heating wire will trace a path as shown by the dotted lines 44 which ensures that the high temperature is not applied directly to the bubbles and also that the seal at the conduits 14 is generally transverse to the individual conduits.

The heat sealing rollers 36 and 38 are arranged to seal the bubbles after an entire diagonal row has been inflated. For example, as shown in FIG. 5, the heat sealing rollers must not seal the conduit 14 between bubble $E_1$ and channel 15 until all of the bubbles $E_1$–$E_5$ have been inflated because after that seal has been made, it is no longer possible to provide air to the remaining bubbles in the diagonal line which has been sealed. After the conduit 14 between bubble $E_1$ and channel 15 is sealed, as the sheet continues to move in the direction of arrow 40, the conduit 14 between bubbles $E_1$ and $E_2$ is sealed and so forth until finally the conduit between bubble $E_4$ and $E_5$ is sealed. At this point, each of the bubbles $E_1$–$E_5$ is independent of the remaining bubbles.

The same procedure, of course, applies to each successive diagonal row of bubbles. When the leading bubble of each row, e.g. bubble $C_1$, reaches the blade 32, cutting edge 34 cuts the channel 15 so that the inflated bubble sheet can be separated from the nozzle 30 for use in conventional fashion. Because the nozzle 30 fits tightly within the channel 15 it is still possible to expand the bubbles through the unsevered portion of channel 15 below the outlet of nozzle 30.

Other arrangements of the conduits can be shown in addition to what is illustrated in FIGS. 1 and 2. It is not necessary that each diagonal row of bubbles be separately inflatable and any practical number of diagonal rows may be interconnected so that they can be simultaneously inflated.

What is claimed is:

1. Collapsible air cell dunnage, comprising:
   a bubble sheet having two side edges and comprising a bubble layer containing a multiplicity of protruding air cells and a base layer fused to the bubble layer, the air cells in said bubble layer arranged in parallel diagonal rows extending from side to side across the bubble sheet, a common channel adjacent one side edge of the bubble sheet and a multiplicity of conduits interconnecting each of the cells in a single diagonal row to each other and to the common channel so that substantially all of the air in the individual cells can be expelled through the common channel when the bubble sheet is compressed progressively by a member extending across the bubble sheet generally transverse to the diagonal rows.

2. Collapsible air dunnage according to claim 1, wherein the cells of each group are only connected to the cells of that group.

* * * * *